Fenton M. Wood
INVENTOR

BY Arnold, Roylance, Kruger & Durkee
ATTORNEYS

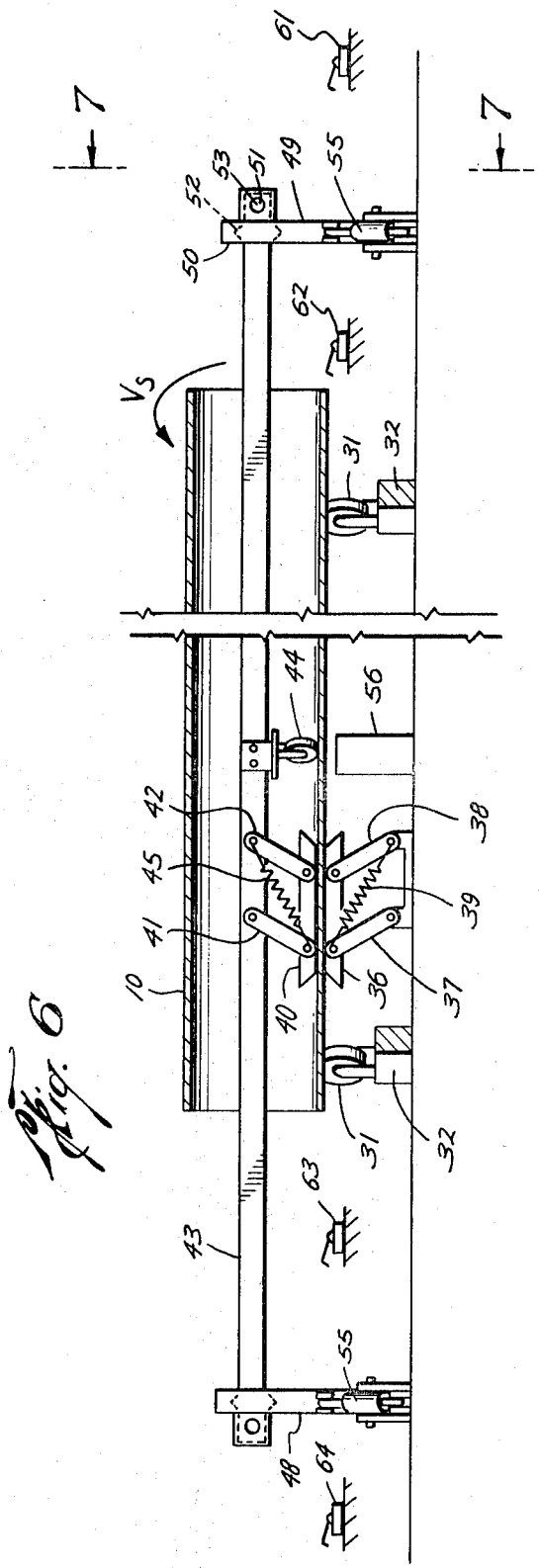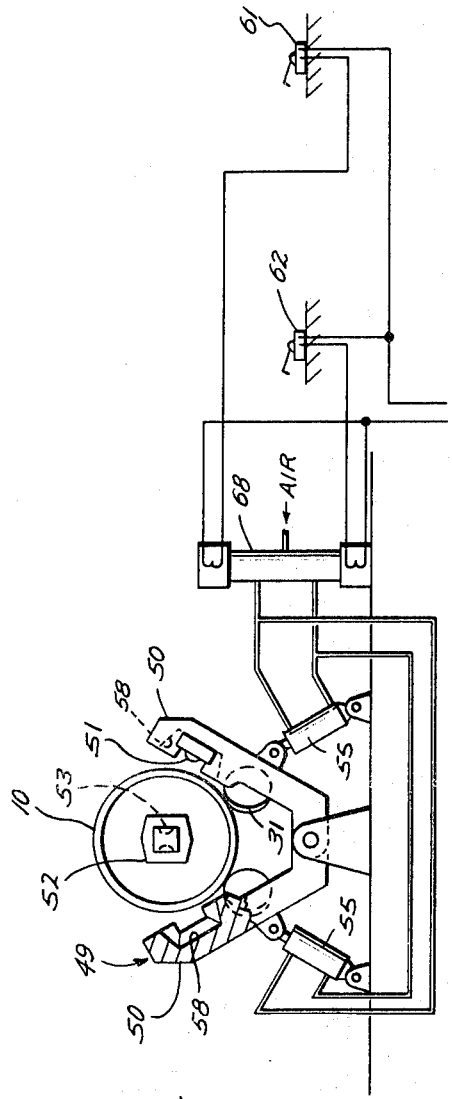

United States Patent Office 3,535,624
Patented Oct. 20, 1970

3,535,624
APPARATUS FOR INSPECTING THE INSIDE AND OUTSIDE OF A TUBULAR MEMBER CONTINUOUSLY MOVING IN ONE DIRECTION
Fenton M. Wood, Houston, Tex., assignor to American Machine & Foundry Company, New York, N.Y., a corporation of New Jersey
Filed June 13, 1967, Ser. No. 645,686
Int. Cl. G01r 33/12
U.S. Cl. 324—37                                     2 Claims

ABSTRACT OF THE DISCLOSURE

Magnetic detection means and method for detecting flaws in ferromagnetic tubular products. Longitudinal and transverse defect detectors are pivotally mounted and positioned adjacent to less than the entire circumference of the product under inspection. Relative transverse and longitudinal motion is established between the detectors and the product so that the entire surface of the product is examined by the detectors in a single scan of the product.

BACKGROUND OF THE INVENTION

This invention relates to magnetic testing and more particularly to a method and apparatus for magnetic detection of longitudinal and transverse defects in the inner and outer surfaces of tubular ferromagnetic products, including products of nickel and cobalt as well as of iron.

The American Petroleum Institute has established minimum standards of acceptability for tubular products used in the oil drilling, production and transporting industries. Today it is common practice to employ nondestructive electromagnetic techniques in checking pipe for such defects as pits, surface cracks and the like. In accordance with these techniques, magnetic flux is established in the pipe, and the magnetic pattern in the pipe is studied by detector means such as pick-up coils suitably mounted adjacent to the pipe surface under examination. By maintaining a relative motion between the pipe surface and the pick-up coils, changes in flux pattern due to surface defects will induce a signal in the coils. The signal is then recorded or observed through use of any one of a variety of conventional indicator means such as a recording galvanometer, for example.

Since flaws may be either longitudinally or transversely oriented with respect to the axis of the pipe, both transverse and longitudinal flaw detectors must be used. Heretofore, test systems have required two scans of the pipe to detect both longitudinal and transverse flaws. In one system, the pipe is translated through high speed, rotating longitudinal flaw detectors, and then through a transverse flaw detector which utilizes many detectors spaced around the circumference of the pipe. Examples of such apparatus may be found in U.S. Pat. Nos. 2,878,447; 2,995,701; 3,202,914; 3,299,350; 2,685,672; 2,909,393. In another system, the pipe is rotatably translated past stationary longitudinal flaw detectors, and then through transverse flaw detectors spaced around the circumference of the pipe. Examples are found in U.S. Pats. Nos. 2,989,692; 2,685,672; 2,909,393. Both systems are time consuming in requiring two scans, and the equipment is complex. Moreover, the circumference of the pipe under examination may change due to upsets or couplings, for example, thus requiring alterations in the circumferentially-spaced transverse flaw detectors.

SUMMARY OF THE INVENTION

Briefly, according to this invention, apparatus examines the total surface of a tubular ferromagnetic product for both longitudinal and transverse defects in a single scan of the pipe. The apparatus includes longitudinal and transverse defect detector means operatively associated with a product support means which establishes relative longitudinal and transverse motion between the detector means and the product under examination. Preferably, the support means imparts longitudinal and transverse velocities to the product thereby moving the product past stationary longitudinal and transverse detectors. The product support means may include means for supporting stationary detectors adjacent to the interior surface of the product. The longitudinal defect detector means includes magnetic means for establishing transverse magnetic flux in a first portion of the product and flux detector means associated with the magnetic means for studying the magnetic pattern in the first portion. Similarly, the transverse defect detector means includes magnetic means for establishing longitudinal magnetic flux in the second portion of the product and flux detector means associated with the magnetic means for studying the flux pattern in the second portion. The first and second flux detector means may comprise a plurality of longitudinally and transversely oriented pick-up coils, respectively, supported in suitable housing or shoes. The transverse defect detector is not spaced around the circumferene of the product as are conventional transverse defect detectors, but preferably may include only one shoe which is designed to scan the entire surface of the product under examination. The shoe is pivotally mounted so that it need not be altered when the circumference of the product changes, as is necessary with conventional transverse defect detectors. The detectors are operably connected to recorder or alarm means which indicate the presence of a defect.

The invention will be more fully understood from the following detailed description and appended claims when taken with the drawings.

BRIEF DESCRIPTION OF THE DRAWINGS

FIG. 6 is a plan view of pipe support means in accordance with the invention illustrating the positions of transverse flaw detectors for detecting flaws in the inner and outer surfaces of a length of pipe; and FIG. 7 is an end view of the pipe support means of FIG. 6.

DESCRIPTION OF THE PREFERRED EMBODIMENTS

Figure 1:
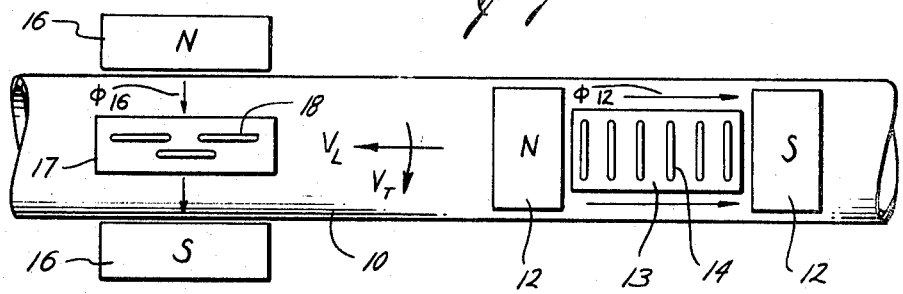
FIG. 1 illustrates the relative positions of longitudinal and transverse defect detectors in accordance with the invention relative to a portion of pipe being examined thereby.

Referring now to FIG. 1, the relative positions of longitudinal and transverse flaw detectors are shown with respect to a portion of pipe 10 under inspection. In accordance with this illustrative embodiment, the flaw detectors are stationary and the pipe is translated longitudinally and transversely past the detectors. The transverse flaw detector includes magnetic means for establishing longitudinal flux $\phi_{12}$ in a first portion of the pipe under consideration. The magnetic means may be the poles 12 of a horseshoe magnet or, alternatively, a solenoid coil positioned around the circumference of the pipe. A flux detector including a shoe 13 for supporting pick-up coils 14 is positioned adjacent to said first portion of the pipe through which the longitudinal magnetic flux is passing, the coils being arranged perpendicular to the lines of flux. Similarly, a longitudinal flaw detector includes conventional means for establishing transverse flux $\phi_{16}$ in a second portion of the pipe, the illustrated means being poles 16 of a horseshoe magnet. Shoe 17 and pick-up coils 18 are positioned adjacent to the second portion of the pipe through which the transverse flux passes. The shoes 13 and 17 may be of conventional design, such as disclosed in U.S. Pat. No. 3,170,114, issued Feb. 16, 1965 to E. A. Placke. The longitudinal flaw detector may be of a fixed type such as shown in copending and co-assigned patent application Ser. No. 292,028, filed Apr. 1, 1963.

Figure 2:
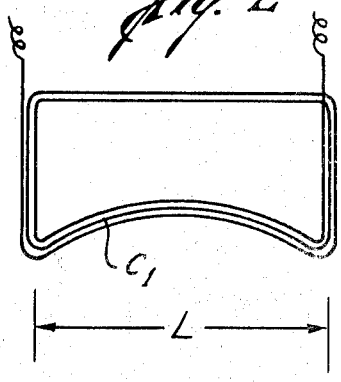
FIG. 2 is a side view of a pick-up coil suitable for use as a transverse defect detector.

The coils 14 in the transverse flaw detector shoe 13 may be vertically or horizontally mounted in the shoe. If vertically mounted, the coils preferably are shaped as shown by coil $C_1$ in FIG. 2. As will be noted, the bottom portion of the coil is concavely shaped to conform to the external curvature of the pipe. Similarly, a coil for use in an internally disposed shoe will have a convex shape to conform to the internal curvature of the pipe. A typical coil may comprise several hundred turns of fine wire such as AWG 40, however, printed circuit coils and etched coils may also be used. Examples of suitable printed circuit coils are found in copending and co-assigned patent application Ser. No. 632,003, filed Apr. 19, 1967. The length L of each coil is selected to provide an acceptable signal to noise ratio for the smallest size crack or other defect which must be detected.

Figure 3:
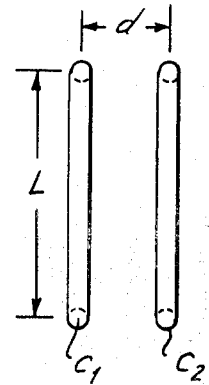
FIG. 3 is a top view of two adjacent pick-up coils in the transverse detector.
Figure 4:
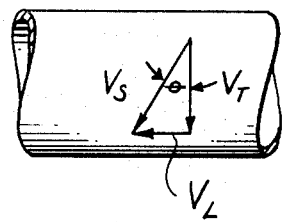
FIG. 4 shows the vector diagram of velocities imparted to a length of pipe.

Referring to FIG. 3, the distance, $d$, between adjacent coils $C_1$ and $C_2$ is selected to insure that the entire pipe is scanned by the transverse flaw detector. The relation between distance $d$ and the length L is determined from the vector diagram for the velocities of the pipe, such as shown in FIG. 4. In FIG. 4, the surface velocity vector $V_S$, transverse velocity vector $V_T$, and longitudinal velocity vector $V_L$ are shown superimposed on a portion of pipe 10. Theta, $\theta$, is the angle between $V_S$ and $V_T$. To insure that the entire pipe surface is scanned by the transverse flaw detector as the pipe moves past the detector, the maximum value of $d$ is given by $$d = L \tan \theta$$

However, if the minimum length crack which will give a defect signal is 1, then $$d = (L-1) \tan \theta$$

Figure 5:
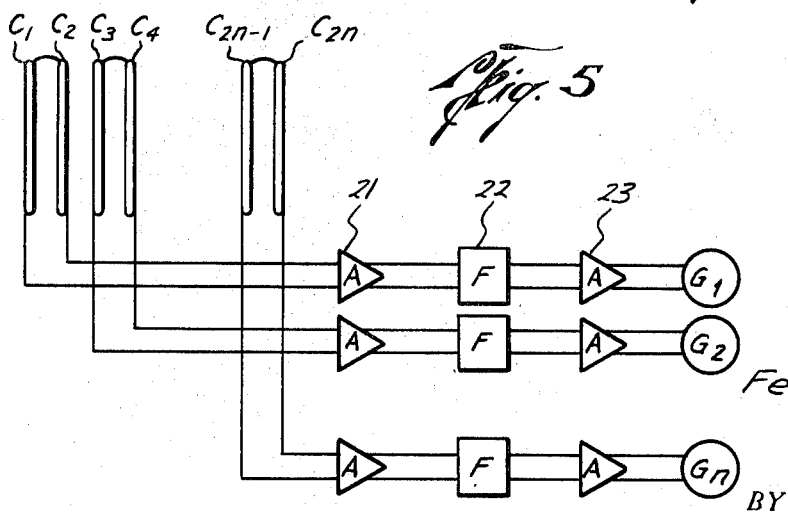
FIG. 5 is a block diagram illustrating the connections between pick-up coils and defect indicating instruments.

The pick-up coils may be operatively connected in a number of ways to suitable recorder or alarm means. For example, each coil may be connected through an amplifier and filter means to a recorder or flaw alarm, or all the amplifier and filter means may be connected through an OR logic gate to a single recorder or alarm. FIG. 5 is a block diagram of an arrangement where the pick-up coils are connected in series-opposed pairs so that each pair gives no response to the normal magnetic pattern of the pipe. In this arrangement, coils $C_1$ and $C_2$ are connected through an amplifier 21, band-pass filter 22, and amplifier 23 to galvanometer $G_1$. Similarly coils $C_3$ and $C_4$ are connected to galvanometer $G_2$, and coils $C_{2N-1}$ and $C_{2N}$ are connected to galvanometer $G_N$. The amplifiers and filters are of conventional design with the band-pass of the filter designed to eliminate high frequency noise due to mill scale and low frequency signals due to undulations in the pipe.

Advantageously, pipe can be tested for both internal and external surface cracks and other defects by a single scan of the pipe by the method and apparatus of this invention. While a flaw detector located adjacent to the exterior surface can be used to detect both interior and exterior flaws (in accordance with the teachings of U.S. Pat. No. 2,881,387 which issued to applicant on Apr. 7, 1959), it is contemplated in this invention that flaw detectors may also be positioned adjacent to the interior surface of the pipe.

FIG. 6 is a plan view of a pipe support means for translating pipe past stationary flaw detectors adjacent to the interior and exterior surfaces of the pipe. Pipe 10 shown in section, is supported and translated by guide rollers 31 mounted on supports 32. The pipe is helically translated from right to left as indicated by the velocity arrow $V_S$. Transverse defect detector shoe 36 is pivotally supported by members 37 and 38 and maintained in contact with the exterior surface of pipe 10 by spring 39. Likewise, shoe 40 is pivotally supported by members 41 and 42 to a rod 43 which extends axially through the pipe. Spring 45 maintains shoe 40 in contact with the interior surface of the pipe. The rod 43 is supported by clamps 48 and 49 outside the pipe and by castors 44 inside the pipe. The clamps are operated by air cylinders 55 which are controlled by switches 61–64. Switches 61 and 62 control the opening and closing of clamp 49 and switches 63 and 64 control the opening and closing of clamp 48.

FIG. 7 is an end view of the pipe support means which better illustrates clamp 49. The clamp, shown in an open position, includes jaw members 50 and electrical connectors 51 which mate with guide 52 and connector 53, respectively, on the end of the rod. The connectors provide electrical connections between the interior detectors and exterior recorders. The air cylinders 55 which operate the jaw members are controlled by an air valve 68, which in turn is controlled by the switches 61 and 62. Whenever either switch is depressed the cylinders are activated by the air valve to open the jaw members. When neither switch is depressed, the jaw members are closed by the air cylinders.

In operation, the pipe is passed from right to left over rod 43 and past the flaw detectors. As the pipe approaches clamp 49, the leading edge of the pipe depresses switch 61 which activates the controls for cylinders 55, thus disengaging clamp 49 and the rod guide 52. When clamp 49 is opened and before pipe 10 engages castor 44, rod 43 is supported by castor 44 resting on support post 56. Depending on the length of rod 43, a number of axially spaced castors 44 and support posts 56 may be utilized. After the pipe passes through the clamp and engages castor 44 in the manner illustrated in FIG. 6, switch 62 is released and the clamp again engages the rod guide 52. To assure accurate registration and contact of the electrical connectors 51 and 53, the guide 52 on rod 43 is somewhat wedge-shaped and tapers in thickness, as shown in broken lines in FIG. 6. As jaw members 50 close toward each other, guide 52 is engaged by the tapering wedge-shaped slots 58 in the jaw members 50. The engagement of guide 52 in slots 58 centralizes rod 43 and aligns connectors 51 and 53, thereby assuring that the desired electrical connection is established. Both clamp means 48 and 49 are identical in this respect. Pipe drive rollers 31 continue driving the pipe longitudinally from right to left and also transversely or rotationally. Accordingly, the total inner and outer surfaces of the pipe are scanned by the transverse defect detector shoes 40 and 36, respectively. Stationary longitudinal defect detector shoes (not shown) scan the surfaces for longitudinal defects. The interior surface detector shoes mounted to rod 43 are electrically connected to suitable alarm or recorder means, as illustrated in FIG. 5, through the redundant connectors 51 on the clamps 48 and 49. Since the two clamps are never open at the same time, the interior detectors will always be connected to the recorder means. As the pipe passes through the shoes, the leading edge of the pipe depresses switch 63 which activates the control means opening clamp 48, thus allowing the pipe to pass through the clamp. After the pipe passes through the clamp, switch 64 is released which activates the control means closing the clamp.

Relative motion between the pipe surface and the detector shoes is necessary, and this is provided by the pipe support in FIG. 6 rotating and axially translating the pipe past the stationary detector shoes. It is to be understood that the relative motion can also be established by rotating the detector shoes as the pipe is translated axially only.

In summary, both longitudinal and transverse flaws in tubular products are detected with apparatus in accordance with this invention by scanning the pipe simultaneously with longitudinal and transverse detector means. The apparatus is less complex than conventional apparatus since conventional circumferentially-spaced transverse flaw detector shoes are replaced by as few as one detector shoe. Consequently, the apparatus is easier to operate when inspecting pipe having upsets, couplings and the like.

While the invention has been described with respect to preferred embodiments, the description is illustrative only and is not to be construed as limiting the scope of the invention. Various modifications and changes may occur to those skilled in the art without departing from the spirit and scope of the invention as defined by the appended claims.

What is claimed is:

1. Apparatus for inspecting a tubular member for defects while the member is continuously translated in one direction past the inspection apparatus, comprising means for continuously translating a tubular member in one axial direction past an inspection position, an elongated rod adapted to extend axially through a tubular member when in said inspection position, detector means carried by said rod at the inspection position and disposed adjacent the inner surface of a tubular member being inspected, electrical connector means located at each end of said rod for providing respective electrical connections to said detector means, first and second releasable clamp means disposed at opposite ends of said inspection position and separated by a distance greater than the axial length of a tubular member to be inspected, said two clamp means releasably engaging respective ends of said rod for supporting the rod axially within the tubular member being inspected, electrical connector means carried by each of said clamp means and adapted to make respective electrical connections with the connector means on said rod when the clamp means are in engagement with said rod and adapted to break the respective electrical connections when the respective clamp means are disengaged from said rod, means for sensing the approach of a tubular member to said inspection position and for responding thereto to disengage said first clamp means from the end of the rod at the entrance end of said inspection position, thereby to permit the tubular member to pass in said one direction through said first clamp means and into the inspection position, means for sensing the passage of the tubular member through said first clamp means and for responding thereto to immediately close said first clamp means to axially support said rod and provide an electrical connection to said detector means, means for sensing when the tubular member approaches said second clamp means traveling in said one direction to open the second clamp means, thereby to permit the tubular member to pass therethrough, means for sensing the passage of tubular member past said second clamp means and for responding thereto to immediately close said second clamp means to support said rod and provide an electrical connection to said second detector means, and means other than said clamp means for supporting said rod when either one of the clamp means is disengaged from its respective end of the rod.

2. The combination claimed in claim 1 wherein the means for translating a tubular member imparts a helical translation to said tubular member.

References Cited

UNITED STATES PATENTS

| | | | |
|---|---|---|---|
| 2,065,118 | 12/1936 | Davis | 324—34.12 |
| 2,258,748 | 10/1941 | Drake | 324—40 |
| 3,271,664 | 9/1966 | Mountz et al. | 324—37 |
| 3,401,332 | 9/1968 | McClurg et al. | 324—37 |
| 2,031,469 | 2/1936 | Drake | 324—37 |
| 2,133,725 | 10/1938 | Sperry et al. | 324—64 |
| 2,308,159 | 1/1943 | Drummond et al. | 324—37 |
| 2,353,211 | 7/1944 | Zuschlag | 324—37 |
| 2,684,464 | 7/1954 | Hastings et al. | 324—37 |
| 2,746,012 | 5/1956 | Price | 324—37 |
| 2,958,818 | 11/1960 | Cowan et al. | 324—37 |
| 2,989,692 | 6/1961 | Price et al. | 324—37 |
| 3,287,632 | 11/1966 | Tompkins | 324—37 |
| 3,299,350 | 1/1967 | Tompkins et al. | 324—37 |
| 3,299,349 | 1/1967 | Tompkins et al. | 324—37 |
| 3,343,079 | 9/1967 | Crouch | 324—37 |
| 3,354,385 | 11/1967 | Wood et al. | 324—37 |

RUDOLPH V. ROLINEC, Primary Examiner

R. J. CORCORAN, Assistant Examiner